US008822065B2

(12) United States Patent
Byun et al.

(10) Patent No.: US 8,822,065 B2
(45) Date of Patent: Sep. 2, 2014

(54) RECHARGEABLE BATTERY WITH CURRENT COLLECTOR PLATE

(75) Inventors: Sang-Won Byun, Suwon-si (KR); Yong-Sam Kim, Suwon-si (KR); Dae-Won Han, Suwon-si (KR); Sung-Bae Kim, Suwon-si (KR); Byung-Kyu Ahn, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 563 days.

(21) Appl. No.: 12/695,151

(22) Filed: Jan. 27, 2010

(65) Prior Publication Data

US 2010/0233521 A1 Sep. 16, 2010

Related U.S. Application Data

(60) Provisional application No. 61/159,257, filed on Mar. 11, 2009.

(51) Int. Cl.
H01M 2/26 (2006.01)

(52) U.S. Cl.
CPC ............... *H01M 2/263* (2013.01); *Y02E 60/12* (2013.01)
USPC .......................................... 429/161; 429/211

(58) Field of Classification Search
USPC ................................................ 429/122–347
See application file for complete search history.

(56) References Cited

U.S. PATENT DOCUMENTS

| 5,702,840 | A | * | 12/1997 | Byon ............................. 429/89 |
| 7,718,312 | B2 | | 5/2010 | Tasai et al. |
| 7,883,795 | B2 | | 2/2011 | Kim et al. |
| 2003/0017389 | A1 | * | 1/2003 | Kasahara et al. ............. 429/176 |
| 2005/0214642 | A1 | * | 9/2005 | Kim et al. .................... 429/211 |
| 2005/0287429 | A1 | * | 12/2005 | Cho et al. ...................... 429/161 |
| 2006/0051664 | A1 | * | 3/2006 | Tasai et al. .................... 429/161 |
| 2006/0222937 | A1 | | 10/2006 | Morimoto et al. |
| 2008/0182166 | A1 | * | 7/2008 | Aota et al. .................... 429/122 |

FOREIGN PATENT DOCUMENTS

| CN | 1713441 A | 12/2005 |
| CN | 1753228 A | 3/2006 |
| CN | 101308920 A | 11/2008 |
| JP | 2005-142026 | 6/2005 |
| JP | 2005-267945 | 9/2005 |
| JP | 2006-228551 | 8/2006 |

OTHER PUBLICATIONS

European Search Report dated Sep. 21, 2010, for corresponding European Patent application10155900.3.

(Continued)

*Primary Examiner* — Jonathan G Leong
(74) *Attorney, Agent, or Firm* — Christie, Parker & Hale, LLP (57) ABSTRACT

A rechargeable battery according to an embodiment of the present invention includes an electrode assembly, a case, electrode terminals, a cap plate, and current collecting plates. The electrode assembly includes a first electrode, a separator, and a second electrode. The case contains the electrode assembly. The electrode terminals are electrically connected to respective electrodes. The current collecting plates have support protrusions inserted into an interior of the electrode assembly, and welding protrusions welded to lateral ends of the electrode assembly.

18 Claims, 5 Drawing Sheets

(56) References Cited

OTHER PUBLICATIONS

Office action issued Mar. 16, 2012 in corresponding Chinese Patent Application No. 201010129224.4, including English translation, 17pp.

European Office action dated May 13, 2011, for corresponding European Patent application 10155900.3.

European Search Report dated May 11, 2010, for corresponding European Patent application 10155900.3.

Patent Abstracts of Japan, and English machine translation of Japanese publication 2005-142026, (15 pages).

SIPO Certificate of Patent dated Dec. 5, 2012, for corresponding Chinese Patent application 201010129224.4, (16 pages).

* cited by examiner

RECHARGEABLE BATTERY WITH CURRENT COLLECTOR PLATE

CROSS-REFERENCE TO RELATED APPLICATIONS

This application claims priority to and the benefit of U.S. Provisional Patent Application No. 61/159,257, filed Mar. 11, 2009 in the United States Patent Office, the entire content of which is incorporated herein by reference.

BACKGROUND OF THE INVENTION

1. Field

The following description relates to a rechargeable battery, and more particularly, to a rechargeable battery having current collecting plates with improved structural characteristics.

2. Description of the Related Art

A rechargeable battery differs from a primary battery in that it can be repeatedly charged and discharged, while the latter generally irreversibly converts chemical energy to electrical energy. A low-capacity rechargeable battery is used as a power supply for small electronic devices, such as cellular phones, notebook computers, and camcorders, while a high-capacity rechargeable battery is used as a power supply for driving motors, for instance, in hybrid vehicles and the like.

A high-power rechargeable battery using a non-aqueous electrolyte with high energy density has been recently developed. For example, the high-power rechargeable battery is constructed with a high-capacity rechargeable battery having a plurality of rechargeable cells coupled to each other in series such that it can be used as a power supply for driving motors in electric vehicles requiring high power.

One high-capacity rechargeable battery is commonly formed with a plurality of rechargeable cells coupled to each other in series. The rechargeable battery may have a cylindrical shape or a prismatic shape.

The prismatic rechargeable battery includes an electrode assembly with positive and negative electrodes and a separator interposed between the two electrodes, a case mounting the electrode assembly therein, a cap plate fitted to the case to seal it and having terminal holes, and terminals inserted into the terminal holes of the cap plate, the terminals protruding out of the case.

With a conventional prismatic rechargeable battery, lead tabs for electrically interconnecting the electrode assembly and the terminals are fixed to the lateral sides of the uncoated regions through ultrasonic welding. However, in order to weld the lead tabs to the lateral sides of the uncoated regions, the uncoated region has a greater length, needlessly enlarging the volume of the electrode assembly.

Furthermore, as the ultrasonic welding is performed on the uncoated regions through the lead tabs, the lead tabs should be thin. However, as the lead tabs are reduced in thickness, the resistance of the lead tabs is increased, and so heat is generated, and the output power is decreased.

Furthermore, if the rechargeable battery is impacted, a contact failure may occur between the lead tabs and the electrode assembly such that heat is internally generated, decreasing the output power.

The above information disclosed in this Background section is only for enhancement of understanding of the background of the invention and therefore it may contain information that does not form the prior art already known in this country to a person of ordinary skill in the art.

SUMMARY

An aspect of an embodiment of the present invention is directed toward a rechargeable battery having a stable connection between the electrode assembly and the terminals.

An exemplary embodiment of the present invention includes a rechargeable battery including an electrode assembly having a first electrode having an uncoated part at the end of the first electrode and having an uncoated side and an uncoated end. The rechargeable battery also includes a current collecting plate having a first member in contact with the uncoated side of the first electrode and a second member in contact with the uncoated end of the first electrode, the second member having a welding portion affixed to the uncoated end of the first electrode.

The electrode assembly of the rechargeable battery may have an interior space. The first member may be a support protrusion, and the support protrusion may be in the interior space. The support protrusion may be substantially identical in height to that of the interior space.

The welding portion of the current collecting plate may be a welding protrusion. The welding protrusion may have a shape selected from the group consisting of triangle, quadrangle, arc, and combinations thereof. The welding protrusion may be welded to the uncoated end of the first electrode.

The current collecting plate may have a first edge and a second edge and the first member may further include a first lateral support extending at an angle from the first edge and a second lateral support extending at an angle from the second edge. The uncoated part at the end of the first electrode may be between the lateral supports and the support protrusion.

The current collecting plate may include an exhaust hole for venting gasses formed in the electrode assembly.

The electrode assembly may include a groove, and the support protrusion may be substantially identical in height to that of the interior space plus the groove.

The current collecting plate may further include an exhaust passage indentation facing opposedly from and corresponding in position to the support protrusion.

The rechargeable battery of may also include a case housing the electrode assembly, an electrode terminal electrically connected to the electrode assembly, and cap plate coupled to an opening of the case. The electrode assembly may also include a second electrode having an uncoated part at the end of the second electrode and having an uncoated side and an uncoated end. The rechargeable battery may also include a second current collecting plate comprising a first member in contact with the uncoated side of the second electrode and a second member in contact with the uncoated end of the second electrode. The second member of the second current collecting plate may be a welding portion affixed to the uncoated end of the second electrode. The case of the rechargeable battery may have a prismatic shape.

The cap plate of the rechargeable battery may have a vent. The current collecting plate may include an exhaust hole, the first member of the current collecting plate may have a support protrusion, and the current collecting plate may have an exhaust passage indentation opposite and corresponding to the support protrusion. The vent, the exhaust hole, and the exhaust passage may be configured to release gas produced in the electrode assembly by allowing the gas to travel through the exhaust hole, through the exhaust passage, and out the vent.

A rechargeable battery according to an exemplary embodiment of the present invention may include an electrode assembly comprising a first electrode comprising an uncoated portion at the end of the first electrode and having a first uncoated side, a second uncoated side, and an uncoated end. The rechargeable battery may also include a current collecting plate comprising a first member extending away from the current collecting plate and in contact with at least one of the first uncoated side or the second uncoated side of the first electrode and a second member in contact with the uncoated end of the first electrode, the second member having a welding portion affixed to the uncoated end of the first electrode.

The electrode assembly of the rechargeable battery may include an interior space and the first member may include a support protrusion in contact with the first uncoated side of the first electrode. The first member may also include a lateral support extending at an angle from a side of the current collecting plate in contact with the second side of the first electrode. The electrode assembly may be secured between the support protrusion and the lateral support.

A rechargeable battery according to an exemplary embodiment of the present invention may include an electrode assembly having a first electrode, a second electrode, and a separator between the first electrode and the second electrode. The electrode assembly may also have an interior space. A rechargeable battery may also include a current collecting plate in contact with an uncoated end of the first electrode having a support protrusion in the interior space. The support protrusion may have a height substantially identical to that of the interior space. The current collecting plate may also include a welding protrusion affixed to the uncoated end of the first electrode.

DESCRIPTION OF REFERENCE NUMERALS INDICATING SOME ELEMENTS IN THE DRAWINGS

| 100: rechargeable battery | 10: electrode assembly |
| 11: positive electrode | 12: negative electrode |
| 13: separator | 14: interior space |
| 15: groove | 21: positive electrode terminal |
| 22: negative electrode terminal | 30: cap plate |
| 34: case | 50: current collecting plate |
| 51: attachment plate | 52: support protrusion |
| 54: welding protrusion | 63: lateral support |
| 75: exhaust hole | 76: exhaust passage indendation |

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification.

Figure 1:
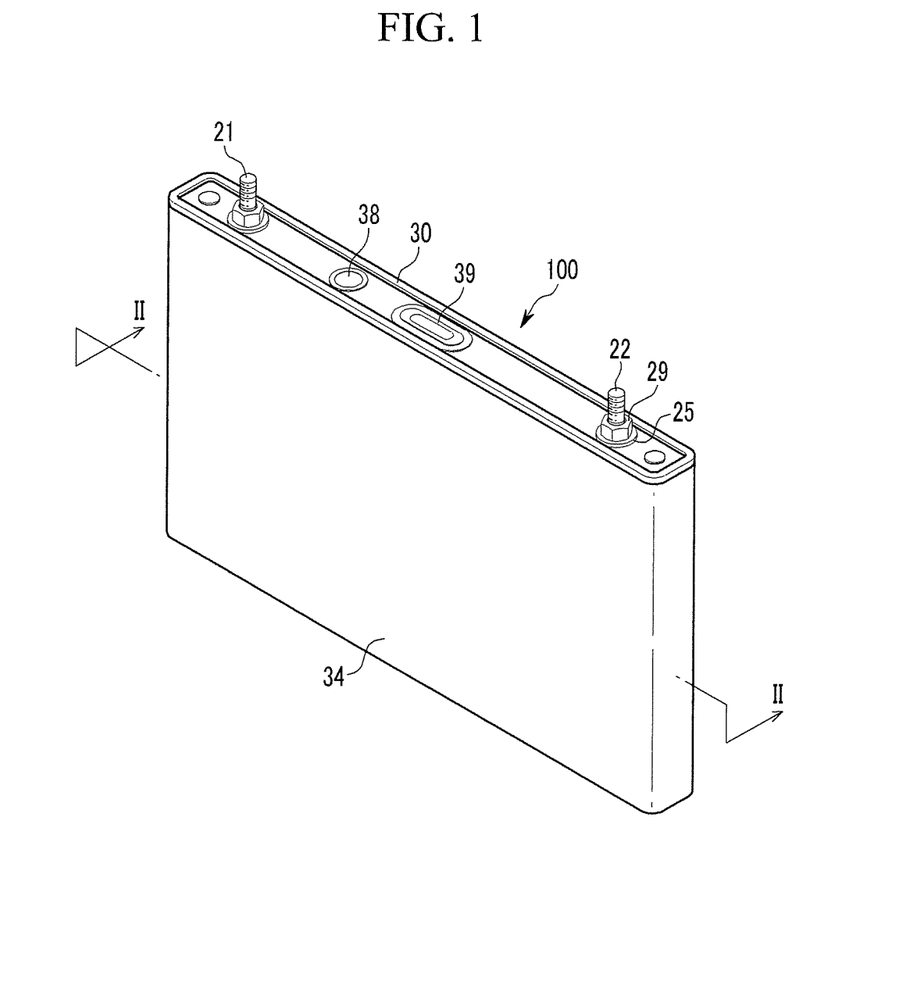
FIG. 1 is a perspective view of a rechargeable battery according to a first exemplary embodiment of the present invention.
Figure 2:
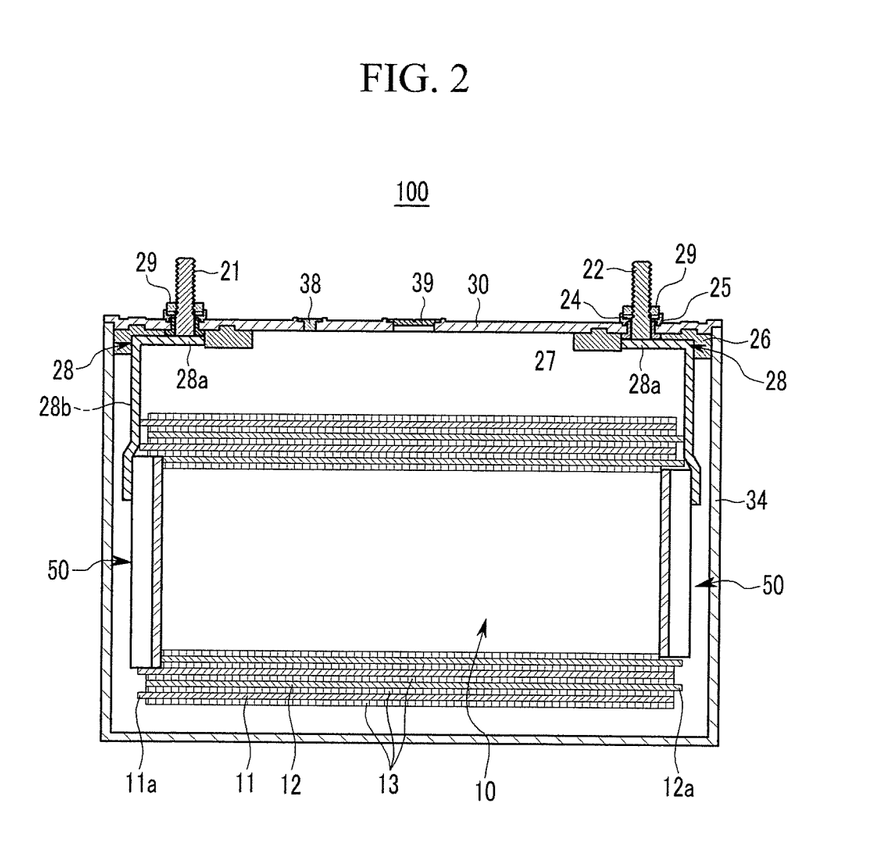
FIG. 2 is a cross-sectional view of the rechargeable battery taken along the II-II line of FIG. 1.

FIG. 1 is a perspective view of a rechargeable battery according to a first exemplary embodiment of the present invention, and FIG. 2 is a cross-sectional view of the rechargeable battery taken along the II-II line of FIG. 1.

Referring to FIG. 1 and FIG. 2, a rechargeable battery 100 according to the first exemplary embodiment includes an electrode assembly 10 which is formed by winding positive and negative electrodes 11 and 12 with an insulating separator 13 therebetween. The electrode assembly 10 is mounted in a case 34, positive and negative electrode terminals 21 and 22 are electrically connected to the electrode assembly 10, and a cap plate 30 is fitted to an opening of the case 34. As an example, the rechargeable battery according to the first exemplary embodiment will be described as a prismatic lithium-ion rechargeable battery.

The positive and negative electrodes 11 and 12 each have a coated region, where a current collector, which can be on a thin metal foil plate, is coated with an active material. Each of the electrodes also have uncoated regions 11a and 12a where active material is not coated.

Figure 3:
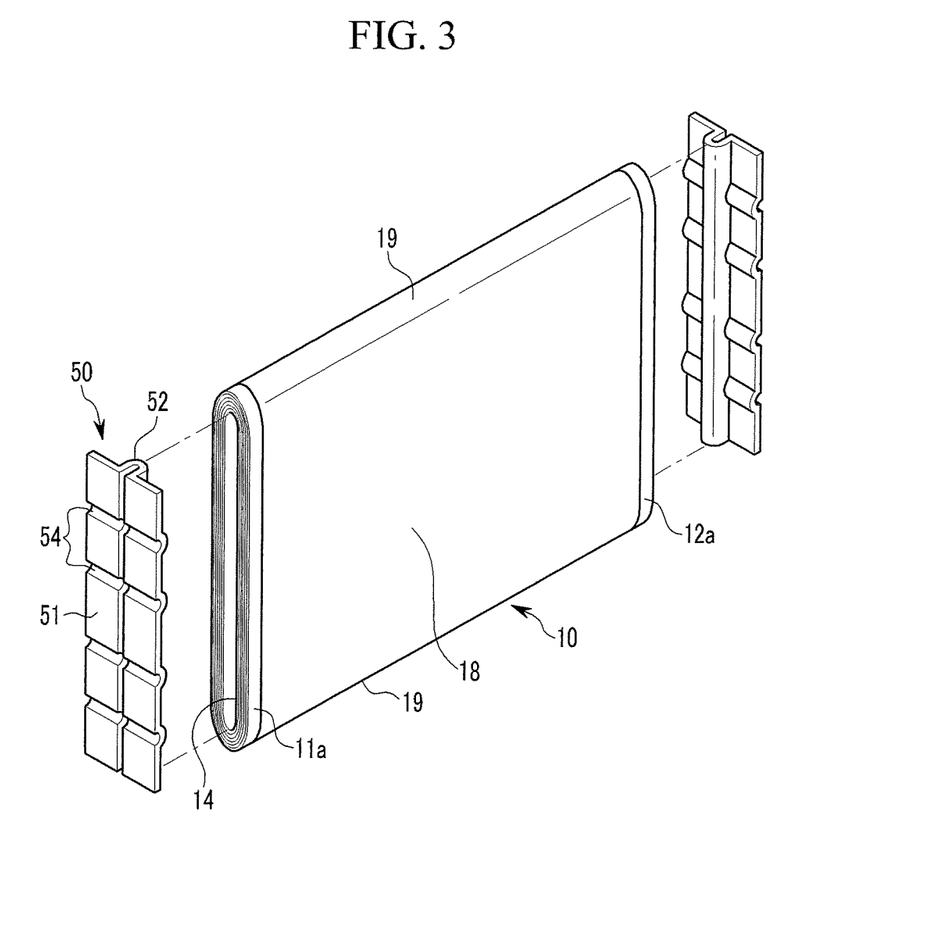
FIG. 3 is an exploded perspective view of an electrode assembly and current collecting plates according to the first exemplary embodiment of the present invention.

The positive electrode uncoated region 11a is formed on one lateral end of the positive electrode 11 in a longitudinal direction thereof, and the negative electrode uncoated region 12a is formed on the opposite lateral end of the negative electrode 12 in a longitudinal direction thereof. After the insulating separator 13 is interposed between the positive and negative electrodes 11 and 12, the electrodes 11 and 12 and the separator 13 are wound. The electrode assembly 10 is wound and pressed flatly like a plate so that flattened portions 18 are formed at the circumferential surface thereof together with bent (or rounded) portions 19, disposed at both ends of the flattened portions 18, as shown in FIG. 3.

The cap plate 30 is formed using a thin plate, and an electrolyte injection opening is formed in the cap plate 30. A sealing valve 38 is provided at the electrolyte injection opening. A vent member 39 is included at the cap plate 30 such that it may be broken at a set or predetermined internal pressure. The vent member 39 may have an indentation or groove that is configured to cause the vent member 39 to break when the pressure inside the battery case reaches a set or predetermined internal pressure.

An upper gasket 25 and a lower gasket 27 are provided between the cap plate 30 and each of the terminals 21 and 22 so as to insulate the cap plate 30 and the terminals 21 and 22 from each other. Unless otherwise specified, as used herein, the term "terminal" refers to both the positive and negative electrode terminals.

The lower gasket 27 is fitted to the terminal hole, and the upper gasket 25 is installed on the cap plate 30. A washer 24 is provided on the upper gasket 25 in order to improve the coupling thereof. Nuts 29 are respectively coupled to the positive and negative electrode terminals 21 and 22 to support them from the top.

A current collecting plate 50 is welded to the positive electrode uncoated region 11a of the electrode assembly 10, and is electrically connected to the positive electrode terminal 21 via a lead member 28. Furthermore, another current collecting plate 50 is welded to the negative uncoated region 12a, and is electrically connected to the negative electrode terminal 22 via a corresponding lead member 28. Insulating members 26 are disposed between each of the lead members 28 and the cap plate 30 to insulate the lead members 28 from each other and the cap plate 30. Each of the lead members 28 include current collecting lead portions 28b attached to respective current collecting plates 50, and terminal lead portions 28a attached to the terminals 21 and 22, respectively.

FIG. 3 is an exploded perspective view of the electrode assembly and the current collecting plates according to the first exemplary embodiment of the present invention.

Referring to FIG. 3, the electrode assembly 10 according to the first exemplary embodiment is wound and flatly pressed in the shape of a plate. An interior space 14 is formed at the center of the electrode assembly 10.

Each of the current collecting plates 50 has a first member in contact with a side of the uncoated region of respective electrodes. The first member could be a support protrusion 52 inserted into the interior space of the electrode assembly 10. Each of the current collecting plates 50 also has a second member in contact with an end of the uncoated region of respective electrodes. The second member could be a welding protrusion 54 attached to the lateral ends of the electrode assembly 10 to press against respective uncoated regions 11a and 12a of the electrode assembly 10.

The support protrusion 52 is formed at the center, in a width direction, of the current collecting plate 50, and extends in a longitudinal direction thereof. The current collecting plate 50 is bent to form the support protrusion 52, and accordingly, a concave groove is formed at the backside thereof, i.e., opposite, the support protrusion 52. The height of the support protrusion 52 corresponds to the height of the interior space 14 of the electrode assembly 10.

The support protrusion 52 is inserted into the interior space 14 of the electrode assembly 10 and supports the electrode assembly 10 so that possible contact failures between the electrode assembly 10 and the current collecting plate 50 due to external impacts can be reduced or prevented. The support protrusion 52 supports the electrode assembly 10 in both the width direction and the longitudinal direction of the interior space 14, thereby further stabilizing the electrode assembly 10.

Attachment plates 51 are connected to both lateral ends of the support protrusion 52, and welding protrusions 54 are connected to the attachment plates 51 in a width direction thereof. The welding protrusions 54 protrude toward respective uncoated regions 11a and 12a such that they contact respective uncoated regions 11a and 12a. The attachment plates 51 are bent in the shape of an arc to form the welding protrusions 54, and hence, concave grooves are formed at the backside thereof, i.e., opposite, the convex protrusions. However, the present invention is not limited thereto, and the cross-section of the welding protrusion 54 may also be formed in the shape of a triangle, a quadrangle, an arc, or any other suitable shape.

The attachment plates 51 are tightly adhered to respective lateral sides, or ends, of the electrode assembly 10, and the welding protrusions 54 press against respective uncoated regions 11a and 12a disposed at the lateral ends of the electrode assembly 10. As used herein, the term "lateral side" refers to the side of the target extending vertically in a parallel direction of the central axis of winding.

Therefore, in embodiments of the present invention, the contact area between the welding protrusions 54 and the uncoated regions 11a and 12a can be relatively large. A plurality of the welding protrusions 54 are arranged in the longitudinal direction of the current collecting plate 50 such that they are spaced apart from each other by a distance, and are attached to the lateral side of the electrode assembly 10 through laser welding. When the welding protrusions are attached using laser welding, the current collecting plate is relatively thick compared to when ultrasonic welding is used, and thus the resistance of the current collecting plate can be minimized or reduced.

As the current collecting plate 50 is fixed to the lateral ends of the uncoated regions 11a and 12a, less uncoated region 11a or 12a area is needed, and more of the coated region area having active material may be included, thus increasing the output power of the electrode assembly 10.

Figure 4:
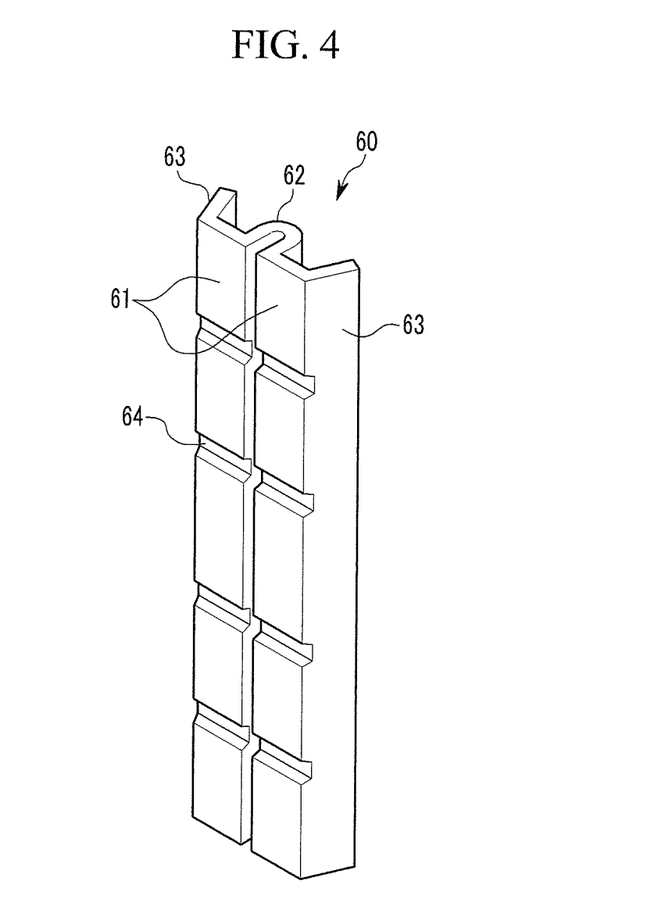
FIG. 4 is a perspective view of a current collecting plate according to a second exemplary embodiment of the present invention.

FIG. 4 is a perspective view of a current collecting plate according to a second exemplary embodiment of the present invention. Referring to FIG. 4, a current collecting plate 60 according to the second exemplary embodiment has a support protrusion 62 which is centrally protruded in a convex manner, attachment plates 61 extending from both sides of the support protrusion 62, and lateral supports 63 extending from the lateral ends of respective attachment plates 61. The lateral supports are in contact with the uncoated region 11a or 12a of the electrode assembly 10.

The support protrusion 62 is formed at the center, in a width direction, of the current collecting plate 60 in the longitudinal direction thereof. The support protrusion 62 is inserted into the interior space of the electrode assembly 10 so as to support the electrode assembly 10.

Welding protrusions 64 extend from the attachment plates 61 connected to both lateral ends of the support protrusion 62 in a width direction and curvedly press against the ends of the electrode assembly so that the welding protrusions are in contact with respective uncoated regions 11a or 12a. The welding protrusions 64 protrude toward a respective uncoated region 11a or 12a so that they contact a respective uncoated region 11a or 12a. The attachment plates 61 are bent in the shape of a quadrangle so as to form the welding protrusions 64, and accordingly, concave grooves are formed at the backside thereof, i.e., opposite, the convex protrusions.

The welding protrusions 64 according to the present exemplary embodiment have a trapezoid sectional shape, but the present invention is not limited thereto. The cross-section of the welding protrusion 54 may be formed with various shapes such as a triangle, an arc, a quadrangle, or any other suitable shape.

Lateral supports 63 are formed at the lateral ends of the attachment plates 61 such that they are bent from the attachment plates 61, for instance, in an inclined manner. The lateral supports 63 contact the outermost surface, or sides, of respective uncoated regions 11a or 12a so as to tightly hold a respective uncoated region 11a or 12a. That is, the one side uncoated region portion is tightly held between one side lateral support 63 and the support protrusion 62, and the other side uncoated region portion is tightly held between the other side lateral support 63 and the support protrusion 62.

As the rechargeable battery according to the present exemplary embodiment is a lithium-ion battery, the uncoated regions 11a and 12a of the lithium-ion battery are formed with a thin film, which is thinner than those of other kinds of batteries, such as a lithium-polymer battery. Furthermore, as the uncoated regions 11a and 12a are thinner than the coated region which includes active material, in a rolled electrode assembly, the uncoated regions may be separated from each other by a distance due to the thickness of the coated region. Accordingly, as the ends of the uncoated regions 11a and 12a are thin, it may be difficult to attach the current collecting plates 60 to respective ends of the uncoated regions 11a and 12a. However, in the present exemplary embodiment, when the uncoated regions 11a or 12a are held between the lateral supports 63 and the support protrusion 62 of respective current collecting plates 60, it is relatively easy to affix the current collecting plate 60 to respective ends of the uncoated regions 11a or 12a through welding.

Figure 5:
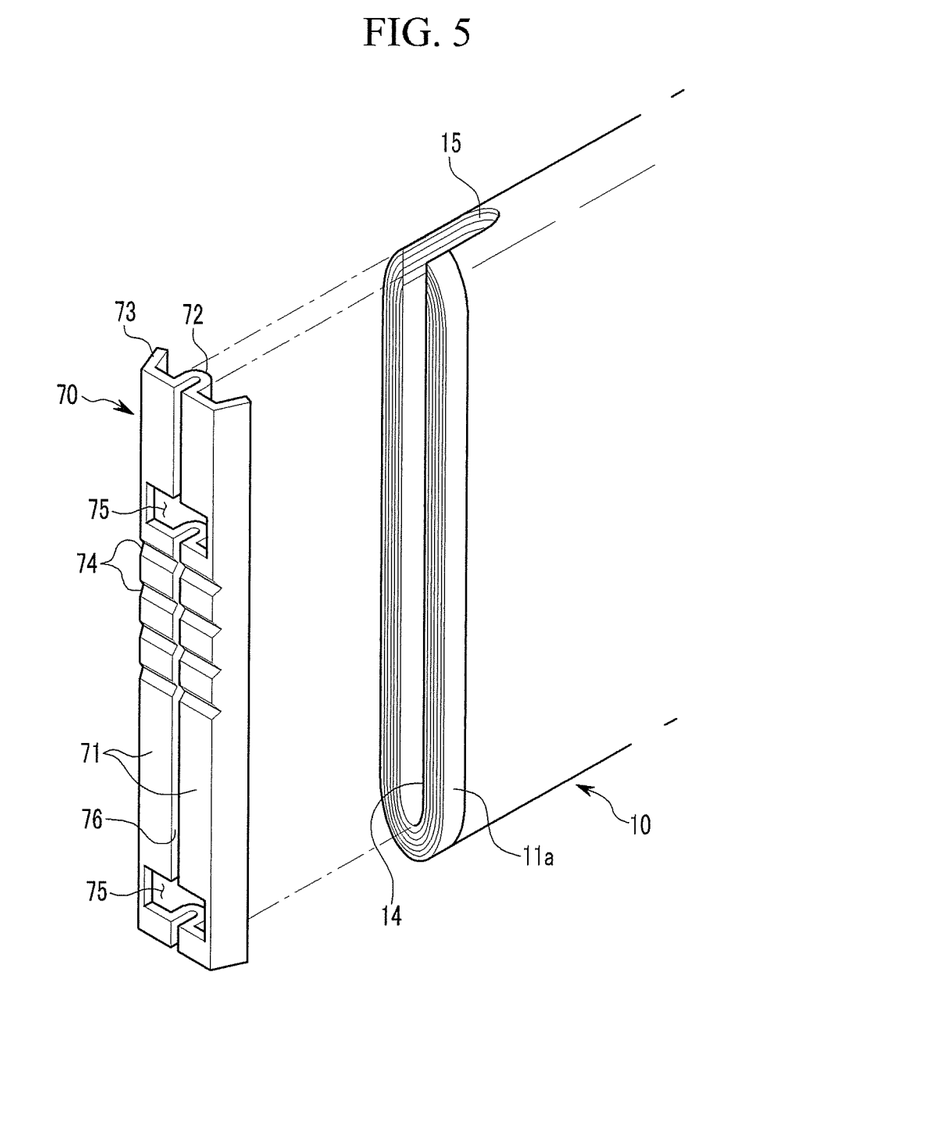
FIG. 5 is a perspective view of a current collecting plate and an electrode assembly according to a third exemplary embodiment of the present invention.

FIG. 5 is a perspective view of a current collecting plate and an electrode assembly according to a third exemplary embodiment of the present invention. Referring to FIG. 5, a current collecting plate 70 according to the third exemplary embodiment includes a support protrusion 72 centrally protruded in a convex manner, attachment plates 71 extending from both sides of the support protrusion 72, and lateral supports 73 extending from the lateral ends of the attachment plates 71 and contacting the uncoated region 11a or 12a of the electrode assembly 10.

The support protrusion 72 is formed at the center, in a width direction, of the current collecting plate 70, and extends in a longitudinal direction. The support protrusion 72 is inserted into the interior space of the electrode assembly 10 so as to support the electrode assembly 10.

Attachment plates 71 are connected to both lateral ends of the support protrusion 72, and welding protrusions 74 are connected to the attachment plates 71 in a width direction and curvedly press against the ends of the electrode assembly so that the welding protrusions are in contact with respective uncoated regions 11a or 12a. The attachment plates 71 are periodically bent in the shape of a triangle to form welding protrusions 74, and accordingly, the welding protrusions 74 curvedly put pressure on the uncoated regions 11a or 12a at the triangular corners thereof.

As the welding protrusions 74 are formed in the shape of a triangle, the welding heat is concentrated on the triangular corners, and thus the current collecting plate and one of the uncoated regions can be easily welded to each other. Furthermore, as the stress is focused on the triangular corners, the uncoated region can be easily bent.

The lateral supports 73 are formed at the lateral ends of the attachment plates 71 such that they are bent from the attachment plates 71 in an inclined manner. The lateral supports 73 contact the outermost surface, or sides, of the uncoated region 11a or 12a so as to tightly contact one of the uncoated regions 11a or 12a.

The top end of the electrode assembly 10 is cut to form a groove 15 for receiving the support protrusion 72. The grooves 15 are disposed at the top of both lateral ends of the electrode assembly 10 so that gas in the interior space of the electrode assembly 10 may flow to an area outside the electrode assembly 10. Furthermore, the support protrusion 72 contacts the bottom end of the interior space while being inserted into the groove 15 at the top end thereof.

Exhaust holes 75 are formed at the top and bottom ends of the current collecting plate 70, respectively, such that they each penetrate through the attachment plate 71 and the support protrusion 72. Furthermore, a concave exhaust passage indentation 76 is at the backside thereof, i.e., opposite, the support protrusion 72 such that it passes through the groove 15 and extends to the top end of the electrode assembly 10. Accordingly, gas generated from the interior of the electrode assembly 10 may flow to the top of the case 34 through the exhaust hole 75 and the exhaust passage 76.

When gas is generated within the electrode assembly 10, the electrode assembly 10 swells so that the charge and discharge efficiency may be deteriorated. However, when the exhaust holes 75 are formed, as in the present exemplary embodiment, gas can be easily exhausted.

Furthermore, it is required that the gas exhausted from the electrode assembly 10 flows to the top so as to apply pressure thereto and operate the vent member 39 at a set or predetermined pressure. In the present exemplary embodiment, when the exhaust passage 76 extends to the top end of the electrode assembly 10, the generated gas can easily flow to the top of the case 34.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
   an electrode assembly having an interior space, the electrode assembly comprising a first electrode comprising an uncoated part at the end of the first electrode, the uncoated part having an inner uncoated side and an uncoated end, the interior space being defined by the inner uncoated side; and
   a current collecting plate comprising: a first member in contact with the inner uncoated side of the first electrode, the first member comprising a support protrusion; and a second member in contact with the uncoated end of the first electrode, the second member having a welding portion affixed to the uncoated end of the first electrode, and the support protrusion being in the interior space,
   wherein the electrode assembly has a groove at a top end of the electrode assembly and the support protrusion is substantially identical in height to that of the interior space plus the groove and does not extend above the top end of the electrode assembly.

2. The rechargeable battery of claim 1, wherein the welding portion is a welding protrusion.

3. The rechargeable battery of claim 2, wherein the welding protrusion has a shape selected from the group consisting of triangle, quadrangle, arc, and combinations thereof.

4. The rechargeable battery of claim 2, wherein the welding protrusion is welded to the uncoated end of the first electrode.

5. The rechargeable battery of claim 1, wherein the current collecting plate has a first edge and a second edge and the first member further comprises a first lateral support extending at an angle from the first edge and a second lateral support extending at an angle from the second edge.

6. The rechargeable battery of claim 5, wherein the uncoated part at the end of the first electrode is between the lateral supports and the support protrusion.

7. The rechargeable battery of claim 1, wherein the current collecting plate has an exhaust hole for venting gasses formed in the electrode assembly.

8. The rechargeable battery of claim 1, wherein the current collecting plate further comprises an exhaust passage indentation facing opposedly from and corresponding in position to the support protrusion.

9. The rechargeable battery of claim 1, further comprising:
   a case housing the electrode assembly;
   an electrode terminal electrically connected to the electrode assembly; and
   a cap plate coupled to an opening of the case;
   wherein the electrode assembly further comprises a second electrode comprising an uncoated part at the end of the second electrode and having an uncoated side and an uncoated end, and a second current collecting plate comprising a first member in contact with the uncoated side of the second electrode and a second member in contact with the uncoated end of the second electrode, the second member having a welding portion affixed to the uncoated end of the second electrode.

10. The rechargeable battery of claim 9, wherein the case has a prismatic shape.

11. The rechargeable battery of claim 9, wherein the cap plate has a vent.

12. The rechargeable battery of claim 11, wherein the current collecting plate comprises an exhaust hole, the first member of the current collecting plate is a support protrusion, and the current collecting plate comprises an exhaust passage indentation opposite and corresponding to the support protrusion, and the vent, the exhaust hole, and the exhaust passage indentation are configured to release gas produced in the electrode assembly by allowing the gas to travel through the exhaust hole, through the exhaust passage, and out the vent.

13. A rechargeable battery comprising:
an electrode assembly having an interior space, the electrode assembly comprising a first electrode comprising an uncoated portion at an end of the first electrode and having a first uncoated side, a second uncoated side, and an uncoated end, the first uncoated side being at an interior of the electrode assembly, and the interior space being defined by the first uncoated side; and
a current collecting plate comprising: a first member extending away from the current collecting plate and in contact with at least one of the first uncoated side or the second uncoated side of the first electrode, the first member comprising a support protrusion; and a second member in contact with the uncoated end of the first electrode, the second member having a welding portion affixed to the uncoated end of the first electrode, and the support protrusion being in the interior space,
wherein the electrode assembly has a groove at a top end of the electrode assembly and the support protrusion is substantially identical in height to that of the interior space plus the groove and does not extend above the top end of the electrode assembly.

14. The rechargeable battery of claim 13, wherein:
the support protrusion is in contact with the first uncoated side of the first electrode and the first member also comprises a lateral support extending at an angle from a side of the current collecting plate in contact with the second uncoated side of the first electrode.

15. The rechargeable battery of claim 14, wherein the electrode assembly is secured between the support protrusion and the lateral support.

16. A rechargeable battery comprising:
an electrode assembly comprising:
a first electrode, a second electrode, and a separator between the first electrode and the second electrode, the electrode assembly having an interior space at least at a winding axis of the electrode assembly; and
a current collecting plate in contact with an uncoated end of the first electrode, the current collecting plate having a support protrusion in the interior space, and a welding protrusion affixed to the uncoated end of the first electrode,
wherein the electrode assembly has a groove at a top end of the electrode assembly and the support protrusion is substantially identical in height to that of the interior space plus the groove and does not extend above the top end of the electrode assembly.

17. A rechargeable battery comprising:
an electrode assembly having an interior space, the electrode assembly comprising a first electrode comprising an uncoated part at the end of the first electrode, the uncoated part having an inner uncoated side and an uncoated end, the interior space being defined by the inner uncoated side; and
a current collecting plate comprising: a first member in contact with the inner uncoated side of the first electrode, the first member comprising a support protrusion; and a second member in contact with the uncoated end of the first electrode, the second member having a welding portion affixed to the uncoated end of the first electrode, and the support protrusion being in the interior space,
wherein the electrode assembly has a groove at a top end of the electrode assembly and the support protrusion is substantially identical in height to that of the interior space plus the groove, and
the current collecting plate further comprises an exhaust passage indentation facing opposedly from and corresponding in position to the support protrusion.

18. A rechargeable battery comprising:
an electrode assembly having an interior space, the electrode assembly comprising a first electrode comprising an uncoated part at the end of the first electrode, the uncoated part having an inner uncoated side and an uncoated end, the interior space being defined by the inner uncoated side; and
a current collecting plate comprising: a first member in contact with the inner uncoated side of the first electrode, the first member comprising a support protrusion; and a second member in contact with the uncoated end of the first electrode, the second member having a welding portion affixed to the uncoated end of the first electrode, and the support protrusion being in the interior space;
a case housing the electrode assembly;
an electrode terminal electrically connected to the electrode assembly; and
a cap plate coupled to an opening of the case,
wherein the electrode assembly further comprises a second electrode comprising an uncoated part at the end of the second electrode and having an uncoated side and an uncoated end, and a second current collecting plate comprising a first member in contact with the uncoated side of the second electrode and a second member in contact with the uncoated end of the second electrode, the second member having a welding portion affixed to the uncoated end of the second electrode,
the cap plate has a vent,
the current collecting plate comprises an exhaust hole, the first member of the current collecting plate is a support protrusion, and the current collecting plate comprises an exhaust passage indentation opposite and corresponding to the support protrusion, and the vent, the exhaust hole, and the exhaust passage indentation are configured to release gas produced in the electrode assembly by allowing the gas to travel through the exhaust hole, through the exhaust passage, and out the vent, and
the electrode assembly has a groove at a top end of the electrode assembly and the support protrusion is substantially identical in height to that of the interior space plus the groove.

* * * * *